United States Patent [19]
Myers et al.

[11] 4,066,533
[45] Jan. 3, 1978

[54] SEPARATION OF CATALYST FROM EFFLUENT OF A FLUIDIZED CATALYTIC HYDROCARBON CONVERSION PROCESS

[75] Inventors: George D. Myers; Paul W. Walters, both of Ashland; Robert L. Cottage, Catlettsburg, all of Ky.

[73] Assignee: Ashland Oil, Inc., Ashland, Ky.

[21] Appl. No.: 744,998

[22] Filed: Nov. 26, 1976

Related U.S. Application Data

[63] Continuation-in-part of Ser. No. 561,625, March 24, 1975, abandoned.

[51] Int. Cl.² .............................................. C10G 11/18
[52] U.S. Cl. ................................. 208/153; 23/288 E; 55/1; 55/345
[58] Field of Search ................ 208/153, 163, 161, 164; 55/1, 342, 345

[56] References Cited

U.S. PATENT DOCUMENTS

| | | | |
|---|---|---|---|
| 1,600,762 | 9/1926 | Hawley | 55/1 |
| 1,746,253 | 2/1930 | Hawley | 55/1 |
| 2,372,316 | 3/1945 | Curtis | 55/342 |
| 2,901,420 | 8/1959 | Evans | 208/153 |
| 3,074,878 | 1/1963 | Pappas | 208/153 |
| 3,993,556 | 11/1976 | Reynolds et al. | 208/164 |

Primary Examiner—Herbert Levine
Attorney, Agent, or Firm—William Kammerer

[57] ABSTRACT

A method for disengaging catalyst particulates from the effluent of a riser tube in the operation of a FCC unit. The catalyst component of the resultant ascending fluid stream is propelled from the riser tube into the catalyst disengaging or collection chamber by virtue of the inertial momentum associated therewith. The vaporous hydrocarbon conversion products containing only residual entrained amounts of catalyst, being passively restrained from entering the disengaging chamber, are simultaneously diverted to a fractionation unit via a cyclonic separator.

5 Claims, 4 Drawing Figures

U.S. Patent    Jan. 3, 1978    4,066,533
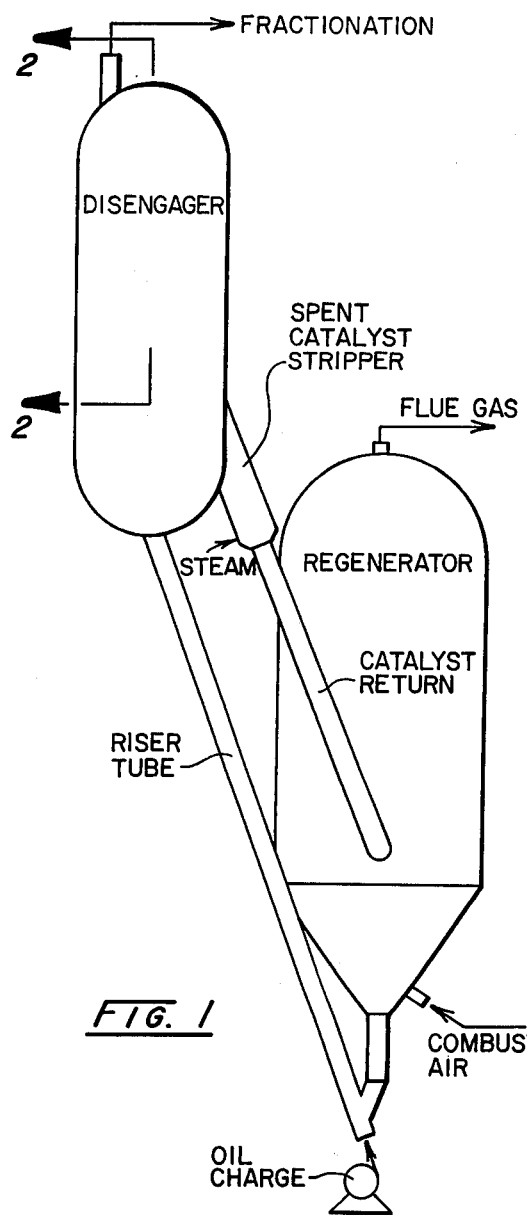
FIG. 1
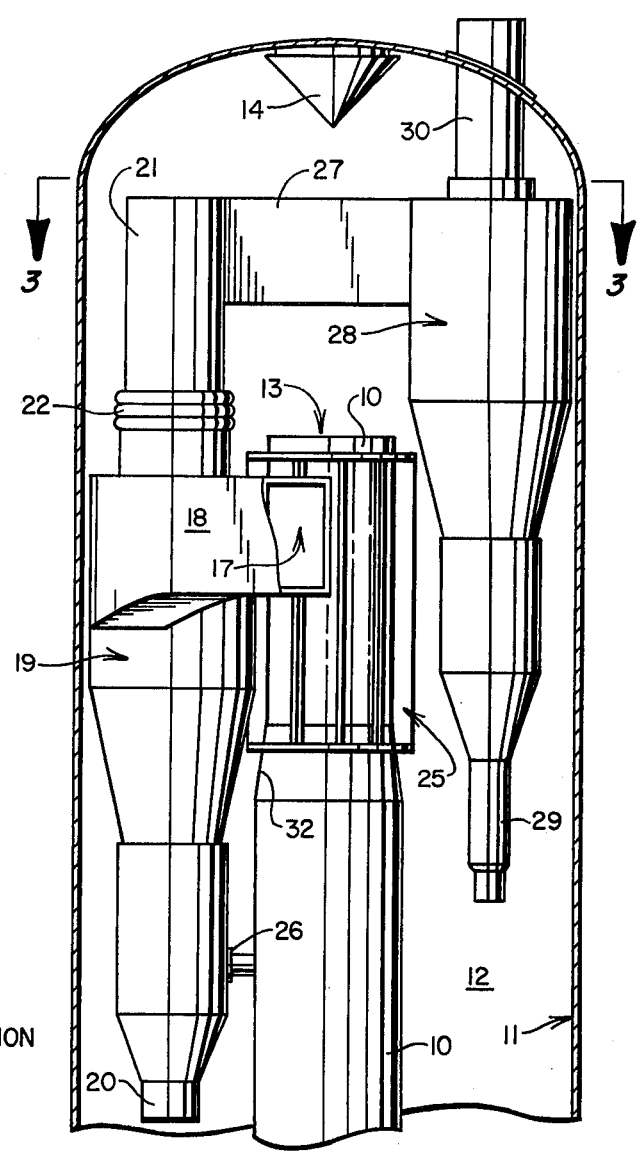
FIG. 2
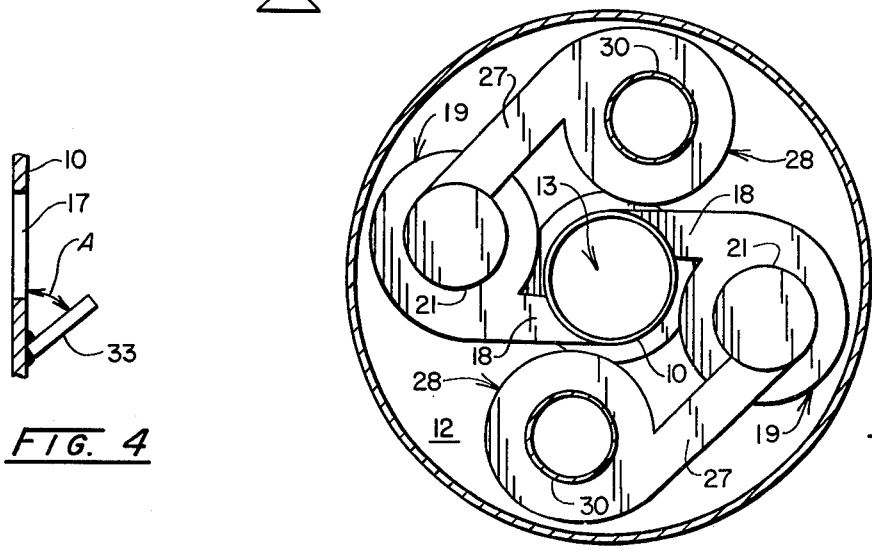
FIG. 4
FIG. 3

4,066,533

SEPARATION OF CATALYST FROM EFFLUENT OF A FLUIDIZED CATALYTIC HYDROCARBON CONVERSION PROCESS

CROSS-REFERENCE TO RELATED APPLICATION

This is a continuation-in-part of application Ser. No. 561,625, filed Mar. 24, 1975, now abandoned.

BACKGROUND OF THE INVENTION

1. Field of the Invention

This invention relates to the fluid catalytic cracking of hydrocarbons and is specifically concerned with the separation of the catalysts from the resultant cracked stream.

2. Description of the Prior Art

The fluid catalytic cracking process, with the advent of the highly active zeolitic type catalysts, has evolved into the generally standardized practice of effecting essentially cocurrent ascending flow of hydrocarbon vapors and the finally divided catalyst in an elongated tubular reaction zone referred to in the industry as a riser tube. Notwithstanding the brevity of of the reaction cycle, which is usually in the order of about 10 seconds or less, there is a laying down of coke on the cataylsts thereby adversely affecting its activity as well as undesirably altering product yield distribution upon reuse. Accordingly, it is the universally observed procedure to separate the catalyst from the riser tube effluent and recycle to the process via a regenerator which serves the dual purpose of combusting the coke contaminants and heating the catalyst for reuse in the reaction cycle.

In accordance with the prior art, separation of the catalyst from the cracked hydrocarbons is carried out within a so-called disengaging chamber. The disengaging chamber is a contained vessel either forming a relatively voluminous shroud about the downstream extremity portion of the riser tube or externally positioned and axially aligned therewith. In the latter type arrangement the fluid stream of catalyst and converted hydrocarbons is discharged into the disengaging chamber directly from the riser tube via a sidewise opening or port. In said shroud type arrangement, however, it is generally preferred to pass the riser tube effluent from said sidewise opening or port firstly through a single-stage cyclone vented to the disengaging chamber. Due to the substantial reduction of the superficial space velocity experienced in the disengaging chamber in either of said modes of operation, a considerable portion of catalyst entrained in the riser tube effluent settles out and collects at the bottom of the chamber. The gas stream thereupon is vented to the fractionator from disengaging chamber via a cyclonic separator positioned therein serving to collect predominantly all of the entrained catalyst.

In light of the fact that the modern zeolitic cracking catalysts range in particle size from about 5 to 100μ with the major portion thereof being in the order of from about 40 to 80μ, separation thereof as practiced in accordance with the aforesaid prior art is nonetheless remarkably efficient. However, the relatively small amount of catalyst entrained in the cracked stream poses a problem because of the tremendous cumulative throughput thereof. The foremost problem is that the catalyst leaving the cracking unit must be recycled thereto in the form of a slurry oil recovered from the fractionator thereby reducing the amount of feedstock that can be accommodated in the cracking unit. Thus, optimal processing efficiency of the cracker is sacrificed.

Accordingly, the principal object of this invention is to secure a more rapid as well as a more efficient separation of the catalyst from the effluent of the riser tube without requiring any basic alteration of the design structure of the recovery systems currently used for this purpose.

SUMMARY OF THE INVENTION

In accordance with the present invention an improved method is provided for effecting the separation of catalyst particulates from hydrocarbon conversion products resulting from the fluid catalytic cracking of a petroleum feedstock. The method comprises axially discharging the bulk of the catalyst present in an ascending, essentially cocurrent flow stream of the catalyst and vaporous hydrocarbons transported in an elongated tubular reaction zone directly into a disengaging chamber. The discharge of the catalyst into the disengaging chamber is accomplished solely by virtue of the inertial momentum associated therewith whereas the converted products containing only residual amounts of catalyst are simultaneously diverted laterally into a cyclonic separation system directly communicating with the reaction zone near the downstream extremity opening thereof from whence the discharge of catalyst is accomplished.

BRIEF DESCRIPTION OF THE DRAWINGS

FIG. 1 is a diagrammatic elevational view of the structural arrangement for a conventional type of a FCC unit.

FIG. 2 is a sectional view, partly in elevation, taken along line 2—2 of FIG. 1 illustrating the terminal portion of the riser tube and its relationship with respect to a disengaging chamber and cyclonic separator designed for implementing the present invention in accordance with a preferred embodiment thereof.

FIG. 3 is a cross-sectional view, partly in elevation, taken along line 3—3 of FIG. 2.

FIG. 4 is a fragmentary vertical section of a baffle or deflector means positioned within the riser tube for minimizing carrying through of catalyst within the cyclonic separator.

DESCRIPTION OF THE PREFERRED EMBODIMENT

Preliminary to providing a detailed description of the process of this invention, a brief outline will be given of the general conditions encountered in operating a typical fluidized catalytic cracker. As shown in FIG. 1, the hydrocarbon feedstock is introduced into the bottom of the riser tube where it mixes with the incoming hot catalyst from the regenerator. The feedstock for this type of unit is generally a vacuum gas oil or a cylinder stock, both overhead fractions of a vacuum distillation still to which reduced crude is introduced as the feedstock. Reduced crude is a residual oil resulting from the atmospheric distillation of crude oil for the purpose of removing naphtha, kerosene and like fractions.

Contact of the hot catalyst leaving the regenerator at a temperature of about 1150°–1350° F. with the feedstock introduced at a temperature of about 500°–800° F. results in an essentially instantaneous generation of large volumes of gaseous hydrocarbons. Generally too, steam is utilized to facilitate the injection of the feedstock which likewise contributes to this volumetric buildup. With the proper selection of temperature in relationship to the riser tube diameter, superficial space or transport velocities in the order of from 35 to 50 feet per second are accordingly realized, such being sufficient to effect essentially cocurrent flow of the catalyst particulates and the vaporous hydrocarbon throughout the riser tube. As indicated previously, the catalyst size customarily ranges from about 5 to 100μ with the major portion thereof being within the range of from 40 to 80μ. The specific transport velocity is selected so as to minimize slippage of the catalyst and yet provide sufficient residence time within the riser tube in order to realize the optimum degree of conversion of the feedstock. Once this conversion has been attained, the object becomes one of separating the catalyst from the cracked hydrocarbons as quickly and efficiently as possible. This is achieved in a catalyst disengaging chamber, all as described hereinabove in connection with the description given of the prior art.

The present invention is directed to an improved method for effecting separation of catalyst particulates from the riser tube effluent basically utilizing the structural arrangements utilized in the prior art for accomplishing this purpose. The improvement will now be discussed in light of the accompanying drawings. As shown in FIG. 2, the downstream extremity portion of riser tube 10 is concentrically disposed in disengaging vessel 11. The space 12 within said disengaging vessel around and above the riser tube 10 comprises the disengaging chamber. At its downstream extremity end, riser tube 10 is in open communication with the disengaging chamber 12 through opening 13, which preferably is an endwise unrestricted opening. Directly above the opening 13 of the riser tube 10 a downwardly facing deflector cone 14 is mounted to the top of the disengaging chamber. The principal purpose of deflector cone 14 is to prevent the discharged catalyst particulates from abrading the upper end of the disengaging vessel. Also this deflector means is appropriately designed to minimize reentry of the particles into the riser tube.

Spaced downstream of, but near the riser outlet opening 13, is at least one port 17 in the sidewall of the riser tube. The preferred embodiment shown comprises a balanced or symmetrical arrangement in which the riser tube is provided with two sidewise rectangular ports 17, 17 which are diametrically opposite one another, each of which serves to directly communicate with a separate two-stage series cyclone separation system. This arrangement is best shown in FIG. 3 wherein each sidewise port 17, 17 is connected via a corresponding lateral or transverse conduit 18, 18 to the respective inlets of first-stage cyclones 19, 19. The cyclones can take the form of any known configuration thereof useful for separating solids from the gases. It is important, however, that the first stage of the individual cyclonic separation systems solely communicates with the corresponding sidewise port 17 so that none of the gases flowing therethrough are discharged into the disengaging chamber.

The gas outlets 21, 21 of the first-stage cyclones are connected through conduits 27, 27 to the respective inlets of the second-stage cyclones 28, 28. The first- and second-stage cyclone diplegs, shown in FIG. 2 at 20 and 29, respectively, discharge the catalyst particles separated in the applicable cyclone to the bottom of the disengaging chamber. The gas outlets 30, 30 of the second-stage cyclones extend through the top of the disengaging vessel and are connected to a manifold leading to the fractionator (not shown).

As can be perceived from the foregoing, there is essentially no net flow of gases within the disengaging chamber 12 under steady state conditions beyond that resulting from the customary practice of introducing a moderate amount of steam for the purpose of stripping the catalyst residing in the bottom of the disengaging vessel. This quiescent condition serves to passively restrain the flow of gases into the disengaging zone and facilitates diversion thereof into the cyclonic separation system. The catalyst particulates, on the other hand, by virtue of the inertial momentum associated therewith are for the most part propelled into the disengaging chamber where they are collected as aforedescribed.

Basically, separation of the catalyst particulates in accordance with this invention is achieved by diverting the gas stream abruptly, that is, laterally in relation to the riser tube while permitting the catalyst to discharge into the disengaging chamber in essentially the flow pattern established in the riser tube. However, this manner of separation can be further enhanced by increasing the transport velocity just upstream of the sidewise ports 17, 17. For this purpose, it is preferred to employ a conical neck or restrictor section in the riser as indicated by the step-down section at 32 in FIG. 2. Alternatively, particularly where an assymetrical or unbalanced cyclone arrangement is used, it is advantageous to employ a baffle or deflector means, taking the form of a deflector plate 33 as shown in FIG. 4. Deflector plate 33 projects angularly inwardly from the riser sidewall just upstream of the sidewall port 17 and in line therewith such that the catalyst particles are deflected away from said port. The plate is positioned at an angle A (about 30°) with respect to the riser tube sidewall and desirably projects laterally to the extent of about 15% of the riser tube diameter.

For the purpose of pointing up the advantages residing in the practice of the present invention vis-a-vis the prior art, relevant comparative data for a plurality of runs embodying the respective practices are given in Table I set forth hereinbelow. In runs designated 1–3 the method for separating the catalyst was in accordance with the present invention employing the structural arrangement shown in FIG. 2. With further reference to FIG. 2, in runs 4–8 catalyst separation was accomplished in accordance with the prior art in which the riser tube opening 13 was capped thus directing the entire effluent through sidewise ports 17, 17 into the inlets of cyclone separators 19, 19. The outlets of the latter cyclones were vented to the disengaging chamber 12 by removal of gas outlets 21, 21 and the corresponding expansion joints 22, 22. Cyclone separators 28, 28 were retained in the position shown with their inlets 27, 27 in open communication with the disengaging chamber 12.

In all runs the catalyst type was CBS-1, a microspherical silica-alumina equilibrium catalyst having an apparent bulk density of about 0.82 grams per cubic centimeter. The data outlined in Table I for the various runs were taken from yield summaries. Where a run number is asterisked the data specified is the 24-hour day average for a seven day continuous operation whereas the other runs were for a single 24-hour period. Stream densities were taken from Petroleum Tables compiled by E. W. Saybolt & Co. and based on API gravity of stream according to yield summaries. In the tabular headings, "Cat. Rate" represents the rate of catalyst circulation through the riser; "Fract. Btms Flow" represents the total flow out of the fractionator bottom stream; "Fract. Btms BSW" is the volume percent of catalyst in the fractionator bottom stream; and "Cat. Loss" is the amount of catalyst not recovered by the cyclones based on the assumption that all catalyst entering the fractionator leaves in the bottom stream. The catalyst loss in pounds per day was computed by converting the fractionator bottom's flow to gallons per day and multiplying by the volume percent of catalyst in the stream density. The catalyst loss in pounds per barrel of charged feedstock was computed by dividing the loss per day by the oil throughout, converted from pounds per hour to barrels per day.

TABLE I

| Run No. | Raw Oil Charge | | | | Fract. Btms. | | | | Cat.Loss Lbs/Bbl Chg. | Cat.Loss Lbs/Day |
|---|---|---|---|---|---|---|---|---|---|---|
|  | Cat.Rate lbs/Hr. | Charge Rate Lbs/Hr. | Grav. API | Density Lbs/Gal | Flow B/D | Grav. API | Density Lbs/Gal. | BSW Vol.% |  |  |
| (INVENTION) | | | | | | | | | | |
| 1* | 720,000 | 117,428 | 24.6 | 7.548 | 1,396 | 10.7 | 8.287 | 0.3 | .164 | 1,458 |
| 2 | 828,000 | 113,443 | 25.0 | 7.529 | 875 | 12.3 | 8.195 | 0.2 | .070 | 602 |
| 3 | 924,000 | 117,926 | 24.3 | 7.563 | 807 | 9.4 | 8.364 | 0.2 | .064 | 567 |
| AVE. | 824,000 | 116,000 | | | | | | | .099 | 876 |
| (PRIOR ART) | | | | | | | | | | |
| 4 | 699,600 | 103,366 | 24.9 | 7.534 | 695 | 3.5 | 8.730 | 1.1 | .357 | 2,803 |
| 5 | 493,200 | 81,798 | 28.1 | 7.383 | 441 | 0.0 | 8.962 | 1.1 | .288 | 1,826 |
| 6* | 636,000 | 107,629 | 26.6 | 7.453 | 747 | 10.6 | 8.293 | 0.3 | .095 | 781 |
| 7* | 768,000 | 108,753 | 26.2 | 7.472 | 850 | 8.6 | 8.412 | 0.6 | .217 | 1,802 |
| 8 | 764,000 | 117,278 | 24.3 | 7.563 | 912 | 8.7 | 8.406 | 0.3 | .109 | 966 |
| AVE. | 673,000 | 103,800 | | | | | | | .266 | 1,636 |

The invention has been primarily described herein in relation to hydrocarbon conversion processes. However, those skilled in the art will recognize that the invention is useful in other catalytic gas phase chemical reactions wherein catalyst particles are contacted with chemicals suspended in a fluid chemical stream flowing in a reactor tube, as well as in other instances wherein particles (whether solid or liquid) are to be disengaged from gases.

What is claimed is:

1. In a method for the fluid catalytic cracking of petroleum hydrocarbons wherein an ascending essentially cocurrent flow of the vaporous hydrocarbon feedstock and catalyst particulates is effected in an elongated tubular reaction zone; the improvement of separating the catalyst particulates from the cracked hydrocarbon stream which comprises discharging said particulates alone by virtue of the inertial momentum associated therewith directly into a catalyst disengaging zone in which there is essentially no net flow of gases under steady state conditions, via an unrestricted downstream extremity opening of said reaction zone while the cracked hydrocarbon stream containing a residual amount of catalyst particulates is diverted laterally prior to said discharging into a cyclonic separation system communicating with the reaction zone near said downstream opening thereof through an opening upstream of and near said downstream extremity opening.

2. The improvement in accordance with claim 1 wherein the cracked hydrocarbon stream is diverted into the cyclonic separation system in a general flow pattern which is essentially at right angle with respect to the flow pattern of said discharged catalyst particulates.

3. The improvement in accordance with claim 2 wherein the fluid steam of cracked hydrocarbons and catalyst particulates is accelerated proximately upstream of effecting said diversion of the hydrocarbon stream into the cyclonic separation system.

4. The improvement in accordance with claim 3 wherein said catalyst has a particle size of not in excess of about 100 microns with a major proportion thereof ranging from about 40 to 80 microns.

5. The improvement in accordance with claim 4 wherein said catalyst comprises a crystalline zeolite aluminosilicate.

* * * * *